United States Patent
Yoon et al.

(10) Patent No.: US 6,819,809 B2
(45) Date of Patent: Nov. 16, 2004

(54) OPTICAL SWITCH USING MICRO-ELECTROMECHANICAL SYSTEM

(75) Inventors: Yong-seop Yoon, Seoul (KR); Hyung Choi, Seongnam (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/619,503

(22) Filed: Jul. 16, 2003

(65) Prior Publication Data

US 2004/0141680 A1 Jul. 22, 2004

(30) Foreign Application Priority Data

Jan. 20, 2003 (KR) .................................. 10-2003-0003667

(51) Int. Cl.[7] .............................................. G02F 1/295
(52) U.S. Cl. .............................. 385/6; 385/4; 359/298
(58) Field of Search .................................. 385/6, 15–23

(56) References Cited

U.S. PATENT DOCUMENTS 6,396,976 B1 * 5/2002 Little et al. .................... 385/18
6,757,457 B1 * 6/2004 Zhang et al. ................... 385/16
6,763,158 B1 * 7/2004 Zhang et al. ................... 385/16

* cited by examiner

Primary Examiner—Akm Enayet Ullah
Assistant Examiner—Jennifer Doan
(74) Attorney, Agent, or Firm—Sughrue Mion, PLLC

(57) ABSTRACT

Provided is a 2×2 optical switch includes a substrate, a first input fiber and a first output fiber, a second input fiber and a second output fiber, a rotating mirror, torsion bars, and an electrostatic force generating part. The first input fiber and a first output fiber are arranged at a predetermined distance from a central point in a first optical path passing through the central point over the substrate. The second input fiber and a second output fiber are arranged at a predetermined distance from the central point in a second optical path that passes through the central point and is orthogonal to the first optical path. The rotating mirror is positioned at around the central point and turns on a turning shaft. The torsion bars support the rotating mirror and the electrostatic force generating part supplies a drive force to the rotating mirror.

15 Claims, 13 Drawing Sheets

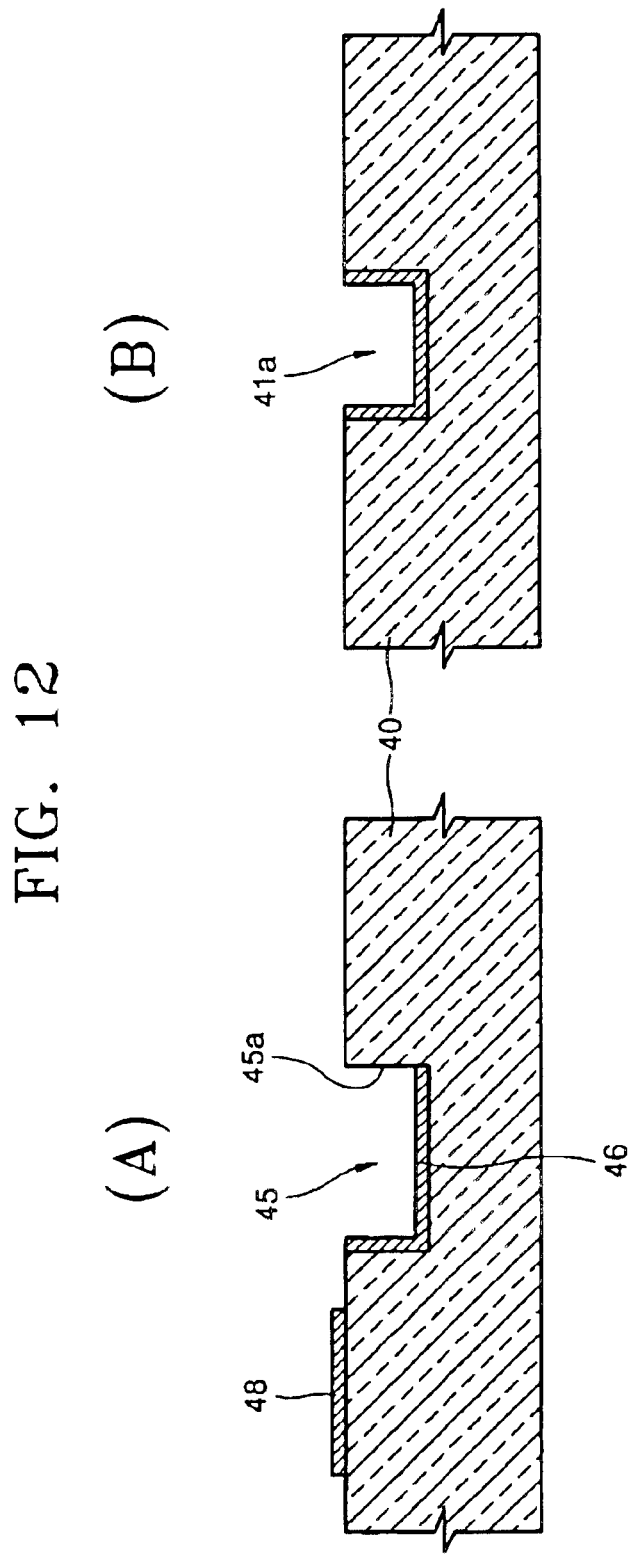

OPTICAL SWITCH USING MICRO-ELECTROMECHANICAL SYSTEM

BACKGROUND OF THE INVENTION

This application claims the priority of Korean Patent Application No. 2003-3667, filed on Jan. 20, 2003, in the Korean Intellectual Property Office, the disclosure of which is incorporated herein in its entirety by reference.

1. Field of the Invention

The present invention relates to an optical switch using a micro-electromechanical system (MEMS), and more particularly, to a 2×2 way optical switch.

2. Description of the Related Art

U.S. Pat. Nos. 6,303,885, 6,315,462, and 6,229,640 disclose techniques for a 2×2 way optical switch used in various optical applications. Optical switches disclosed in U.S. Pat. Nos. 6,229,640 and 6,315,462 have a structure in which a mirror is driven by an electro-static comb drive and the optical switch disclosed in U.S. Pat. No. 6,303,885 has a structure in which a mirror is driven by spring arms. The structures of the optical switches have a common feature in that the mirror moves in parallel with the plane of a substrate by an actuator.

FIG. 1 is a microscopic photo of a conventional 2×2 comb drive optical switch having two inputs and two outputs, and FIG. 2 is a plane view of a portion marked with dotted lines in FIG. 1 to explain the conventional 2×2 comb drive optical switch shown in FIG. 1.

As shown in FIGS. 1 and 2, first and second optical input fibers 2a and 2b, and first and second optical output fibers 3a and 3b are arranged at around the central point P at an angle of 90 degrees. A mirror 1 is positioned at the central point P of the first and second optical input and output fibers 2a, 2b, 3a, and 3b.

As shown in FIG. 3, when the mirror 1 is positioned out of the central point P, optical signals incident through the first and second input fibers 2a and 2b proceed toward the first and second output fibers 3a and 3b on the same axes with the first and second input fibers 2a and 2b without being reflected.

As can be seen in FIG. 4, when the mirror 1 is positioned at the central point P, an optical signal incident through the first input fiber 2a is reflected from one side of the mirror 1 and then proceeds toward the second output fiber 3b, and an optical signal incident through the second input fiber 2b is reflected from the other side of the mirror 1 and then proceeds toward the first output fiber 3a.

Here, as shown in FIG. 4, when an optical signal is reflected by a mirror, the optical signal is reflected out of the central point of the mirror. Thus, the reflected optical signal does not proceed toward the central point of a target fiber. This is caused by an offset of an optical path due to the thickness of the mirror.

The offset causes light loss. The thicker the mirror, the greater the offset, which increases light loss. Accordingly, the thickness of the mirror is required to be reduced as it can be in order to reduce the offset of an optical path changed by the mirror. However, since in the above-described comb drive optical switch, the mirror moves in parallel with the plane of the substrate and a reflective surface of the mirror is perpendicular to the plane of the substrate, there is a limitation in reducing the thickness of the mirror. In particular, when forming a mirror, silicon is vertically etched in a plasma process, and then a metal having a high reflectance is deposited on the surface of the resultant structure. Thus, it is difficult to reduce the thickness of the mirror. Also, since the vertically etched surface is used as a reflective surface, a large amount of light is lost when light is reflected. Furthermore, since a high-priced silicon on insulator (SOI) wafer not a general wafer is used, cost for manufacturing the mirror is high.

SUMMARY OF THE INVENTION

The present invention provides an optical switch capable of reducing an offset of an optical path by reducing the thickness of a mirror.

The present invention also provides an optical switch which can cause a small amount of light loss and be manufactured at a low cost.

According to an aspect of the present invention, there is provided an optical switch including a substrate, a first input fiber and a first output fiber, a second input fiber and a second output fiber, a rotating mirror, torsion bars, and an electrostatic force generating part. The first input fiber and a first output fiber are arranged at a predetermined distance from a central point in a first optical path passing through the central point over the substrate. The second input fiber and a second output fiber are arranged at a predetermined distance from the central point in a second optical path that passes through the central point and is orthogonal to the first optical path. The rotating mirror is positioned at around the central point and turns on a turning shaft extending in parallel with the substrate. The torsion bars support the rotating mirror so that the rotating mirror rotates. The electrostatic force generating part supplies a drive force to the rotating mirror.

In an aspect of the invention, trenches into which the first and second input fibers and the first and second output fibers are inserted are formed in the substrate along the first and second optical paths.

In an exemplary embodiment of the invention, the rotating mirror has a first position where the rotating mirror is parallel with the substrate and a second position where the rotating mirror is perpendicular to the substrate, and turns from the first position to the second position by the electrostatic force generating part.

BRIEF DESCRIPTION OF THE DRAWINGS

The above and other features and advantages of the present invention will become more apparent by describing in detail exemplary embodiments thereof with reference to the attached drawings in which:

FIGS. 12A through 16B are cross-sectional views for explaining a method of manufacturing the optical switch according to the present invention.

DETAILED DESCRIPTION OF THE INVENTION

Hereinafter, an optical switch according to an exemplary embodiment of the present invention will be described in detail with reference to the attached drawings.

Figure 1:
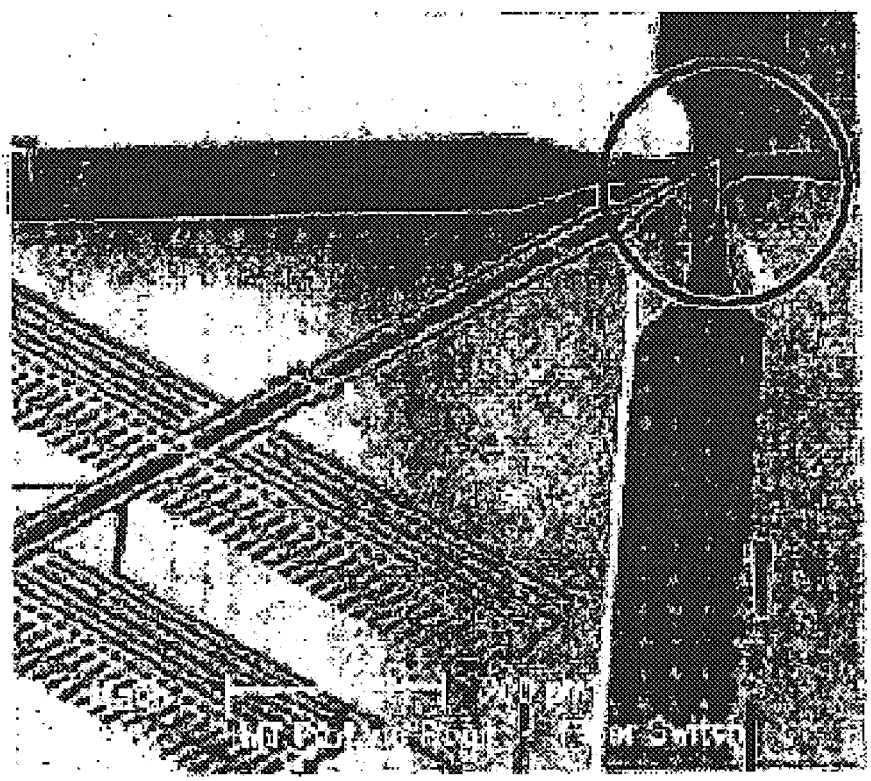
FIG. 1 is microscopic photo of a conventional optical switch including a mirror perpendicular to a substrate.
Figure 2:
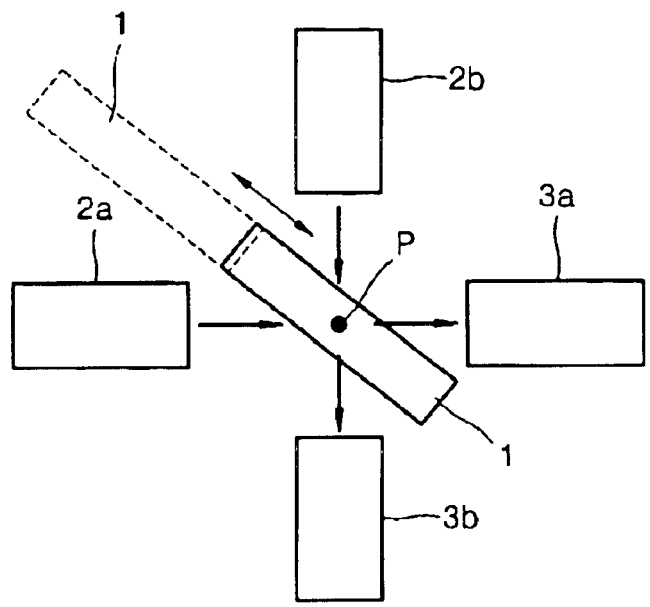
FIGS. 2 through 4 are views for illustrating an optical path changed by the conventional optical switch shown in FIG. 1.
Figure 3:
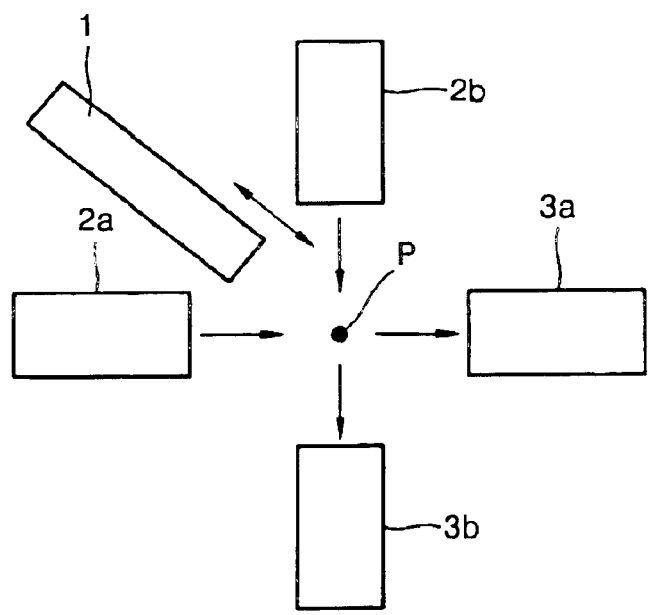
Figure 4:
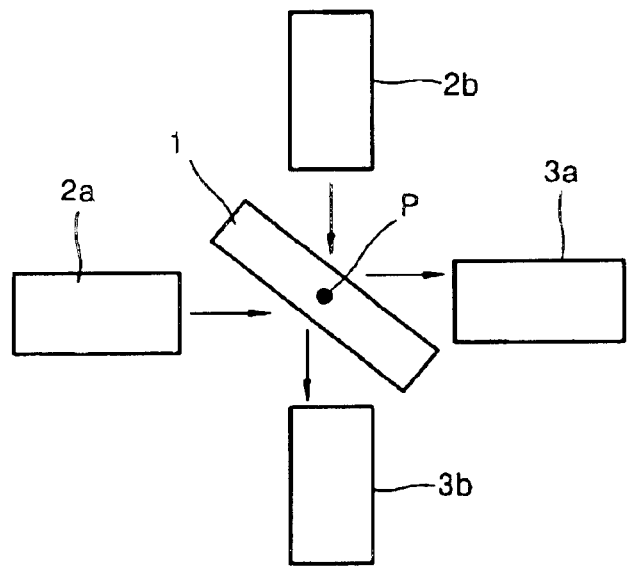
Figure 5:
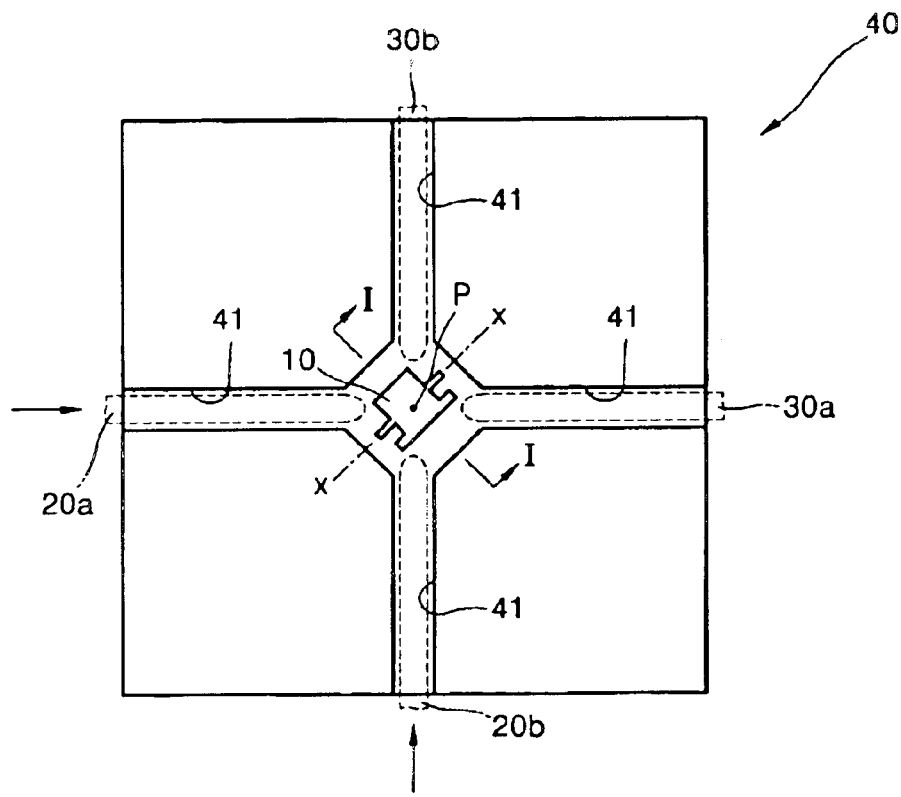
FIG. 5 is a schematic plane view of an optical switch according to the present invention.
Figure 6:
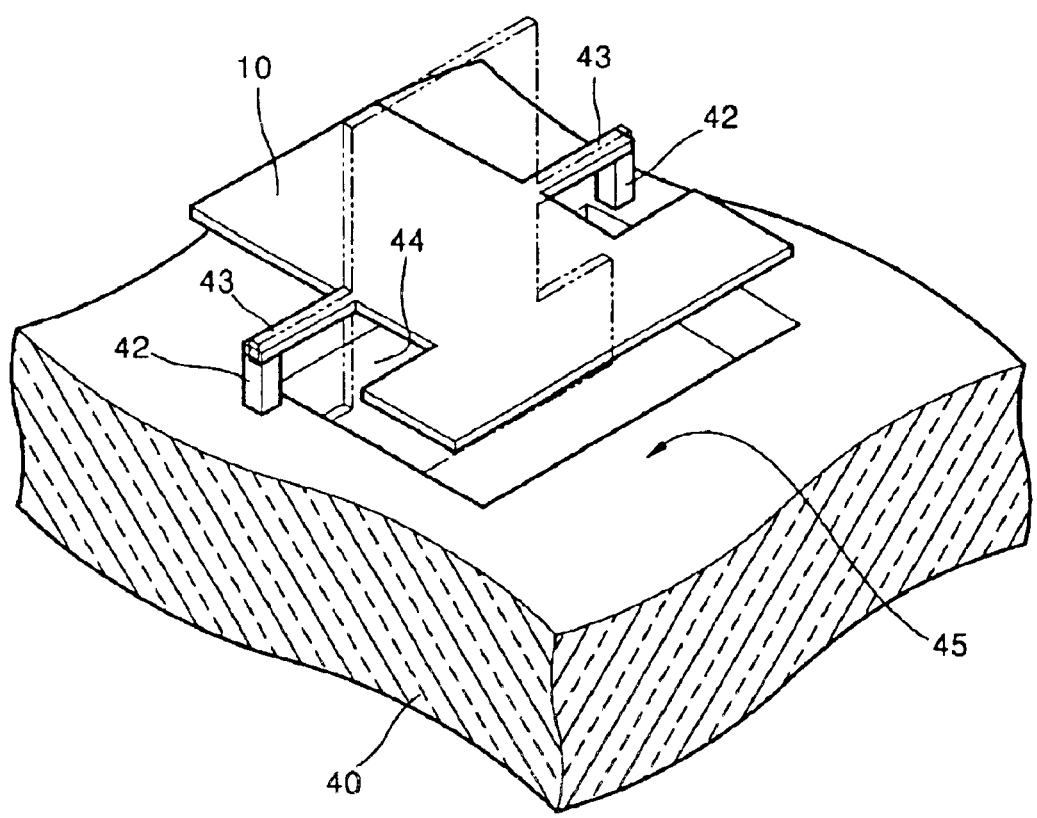
FIG. 6 is a perspective view of a mirror and a mirror driving actuator used in the optical switch according to the present invention.

As shown in FIG. 5, optical input fibers 20a and 20b, and optical output fibers 30a and 30b are arranged at around the central point P at an angle of about 90 degrees. A rotating mirror 10 is positioned at the central point P. As in a general optical switch, the optical input fibers 20a and 20b, and the optical output fibers 30a and 30b are inserted into trenches 41 formed in a substrate 40. The trenches 41 are arranged at around or at about the central point P at an angle of about 90°. As shown in FIG. 6, the rotating mirror 10 is fixed to posts 42 formed on the substrate 40 and supported by torsion bars 43 that extend from the posts 42 in parallel with the substrate 40. The torsion bars 43 support the rotating mirror 10 so that the rotating mirror 10 is parallel with the substrate 40. When the rotating mirror 10 turns due to an electrostatic force, the torsion bars 43 provide a returning force to the rotating mirror 10 so that the rotating mirror 10 returns to the original position. The torsion bars 43 extend toward a turning axis X—X at an angle of approximately 45 degrees with the optical input fibers 20a and 20b and the optical output fibers 30a and 30b. A well 45 is formed under the rotating mirror 10. The well 45 has a rectangular shape and a vertical sidewall 44 contacting one side of the rotating mirror 10 when the rotating mirror 10 turns due to an electrostatic force.

Figure 7:
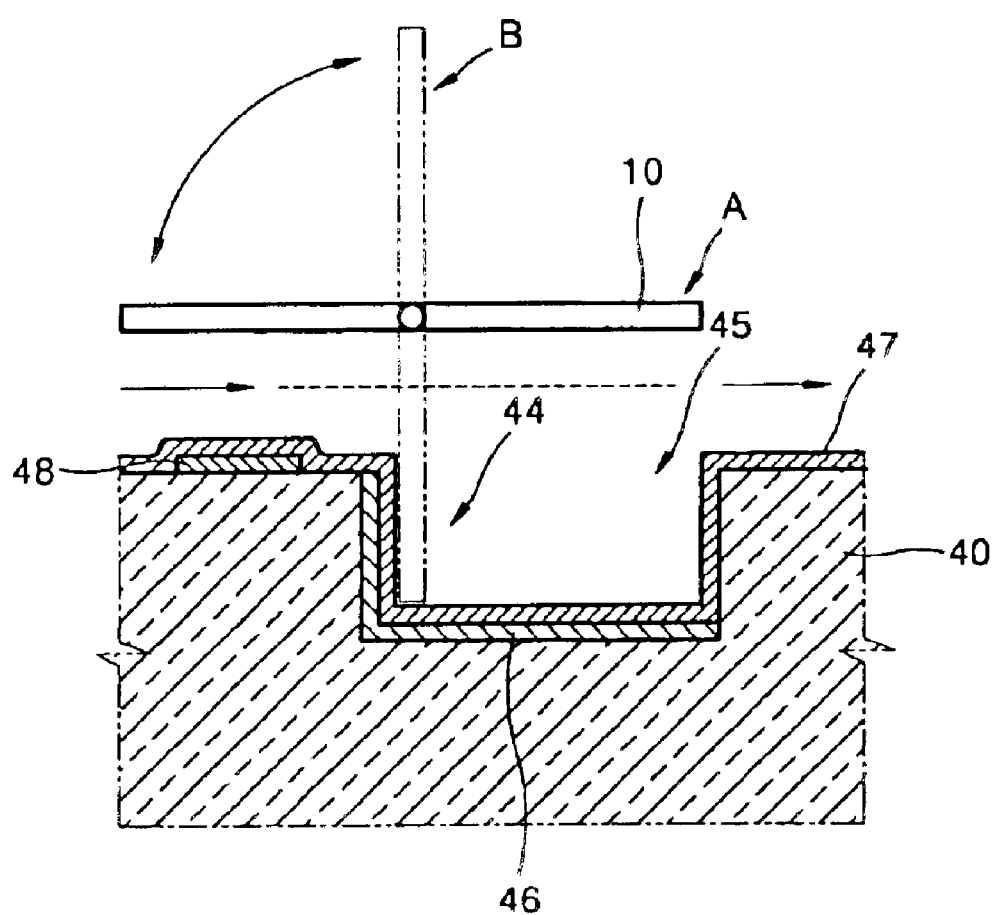
FIG. 7 is a schematic cross-sectional view of the mirror driving actuator shown in FIG. 6.

FIG. 7 shows the cross-section of the well 45 and the rotating mirror 10. Referring to FIG. 7, a fixed electrode 46, which is opposite to the rotating mirror 10 when the rotating mirror 10 faces the vertical sidewall 44, is formed on the vertical sidewall 44. The fixed electrode 46 extends to the bottom of the well 45. A dielectric or insulating layer 47, which serves to prevent the direct contact of the rotating mirror 10 with the fixed electrode 46, is formed on the fixed electrode 46. The rotating mirror 10 is formed of a conductive material, e.g., a metal thin film, and has reflective surfaces on either side thereof. Thus, when the rotating mirror 10 is substantially parallel with the substrate 40 as indicated by "A", the rotating mirror 10 passes a beam so as to optically connect the fibers facing on the same axis, and when the rotating mirror 10 is substantially perpendicular to the substrate 40 as indicated by "B", the rotating mirror 10 reflects an incident beam so as to change the optical path of the incident beam. According to an exemplary embodiment of the present invention, an anti-electrostatic electrode 48, which maintains the same potential as the rotating mirror 10, is formed under the rotating mirror 10 and on an opposite side of the well 45 centering at around the posts 42. This is to prevent an electrostatic force from being generated between the rotating mirror 10 and the vertical sidewall 44 of the well 45 so that an attractive force is generated only in the well 45 due to the electrostatic force.

Figure 8:
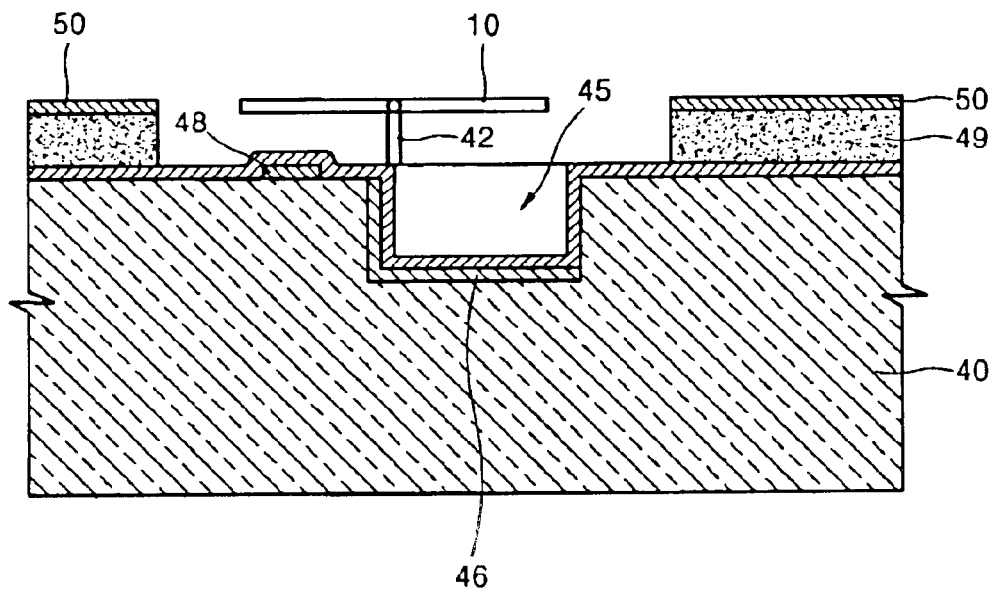
FIG. 8 is a cross-sectional view taken along line I—I of in FIG. 5.

FIG. 8 is a cross-sectional view taken along line I—I of FIG. 5. Referring to FIG. 8, an insulating layer 49 is formed at around the central area in which the rotating mirror 10 is positioned. A metal layer 50 is formed on the insulating layer 49. The metal layer 50 is formed from the same material the rotating mirror 10 is formed from, at the same time, and then separated from the rotating mirror 10 during a patterning process of a process of manufacturing the rotating mirror 10. The insulating layer 49 is a sacrificial layer necessary for forming the rotating mirror 10 and the posts 42, serves as a layer on which a metal thin film is deposited to form the rotating mirror 10, and is locally removed after completing the rotating mirror 10.

Figure 9A:
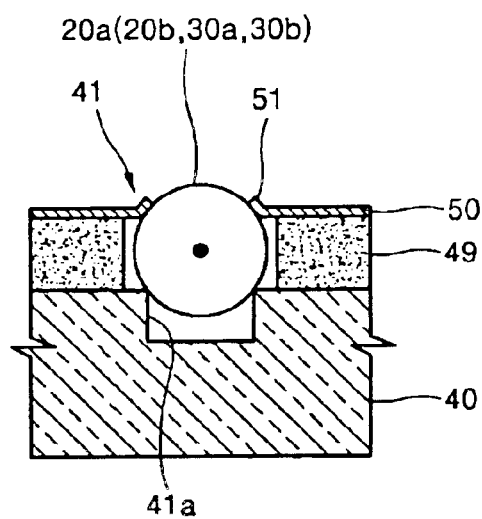
FIG. 9A is a cross-sectional view of a trench into which an optical fiber is fixed, in the optical switch, according to the present invention, shown in FIG. 5.
Figure 9B:
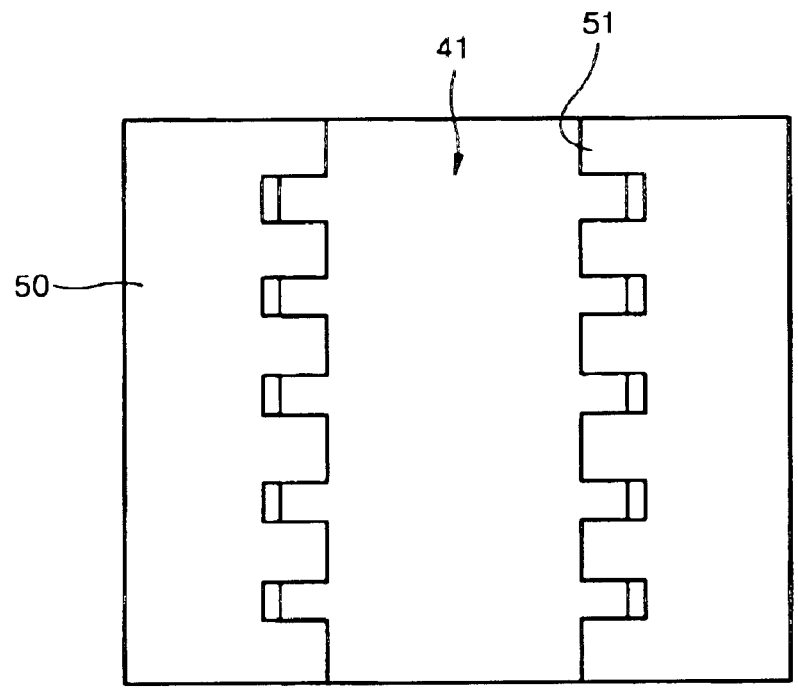
FIG. 9B is a plan view of a spring formed in an opening of a trench into which an optical fiber is fixed in the optical switch according to an exemplary embodiment of the present invention.
Figure 10:
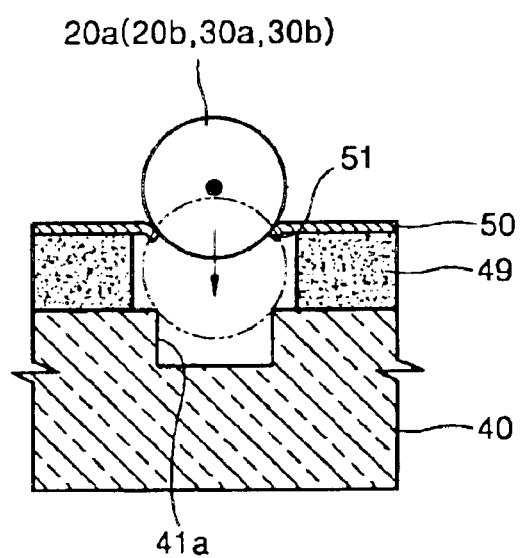
FIG. 10 is a schematic cross-sectional view for explaining a process of inserting an optical fiber into a trench in the optical switch according to the present invention.

FIG. 9A is a cross-sectional view showing the internal structure of the trenches to which the optical input fibers 20a and 20b and the output fibers 30a and 30b are fixed. Referring to FIG. 9, a portion of the insulating layer 49 and a portion of the substrate 40 are etched to form the trenches 41 into which the optical input fibers 20a and 20b and the output fibers 30a and 30b are inserted. Openings of the trenches 41 are narrowed by the metal layer 50. Here, a spring 51 of the metal layer 50 restrains the optical input fibers 20a and 20b and the optical output fibers 30a and 30b from separating from the trenches 41. Referring to FIG. 9B, the spring 51 may be further flexibly comb-shaped. As shown in FIG. 10, the spring 51 elastically deforms so that the optical input fibers 20a and 20b and the optical output fibers 30a and 30b engage the trenches 41. Channels 41a are formed to a width smaller than the diameter of the optical input fibers 20a and 20b and the optical output fibers 30a and 30b in the trenches 41 and in the surface of the substrate 40. The channels 41a support the optical input fibers 20a and 20b and the optical output fibers 30a and 30b and determine the positions of the optical input fibers 20a and 20b and the optical output fibers 30a and 30b.

Figure 11A:
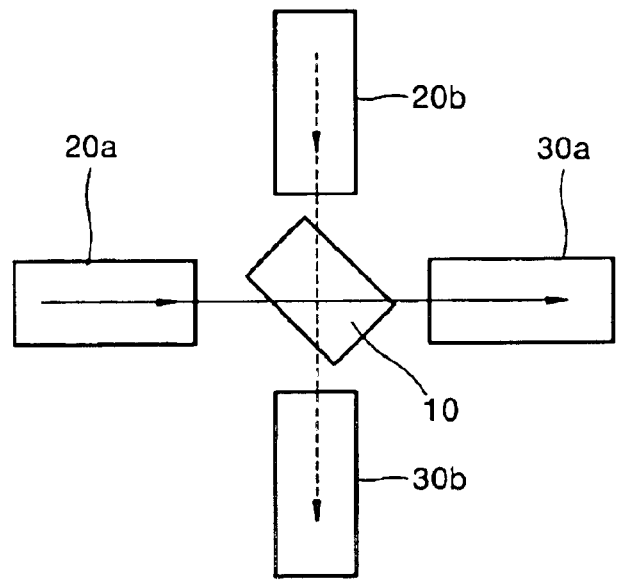
FIGS. 11A and 11B are views for explaining the operation of the optical switch according to the present invention.
Figure 11B:
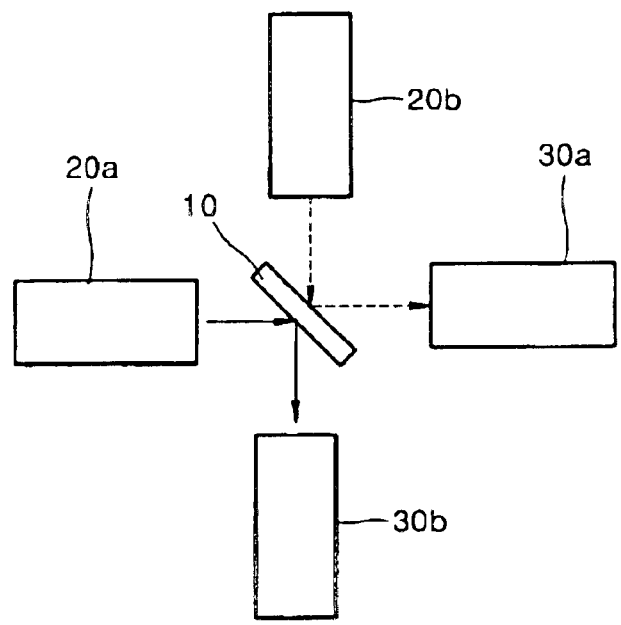
Figure 13:
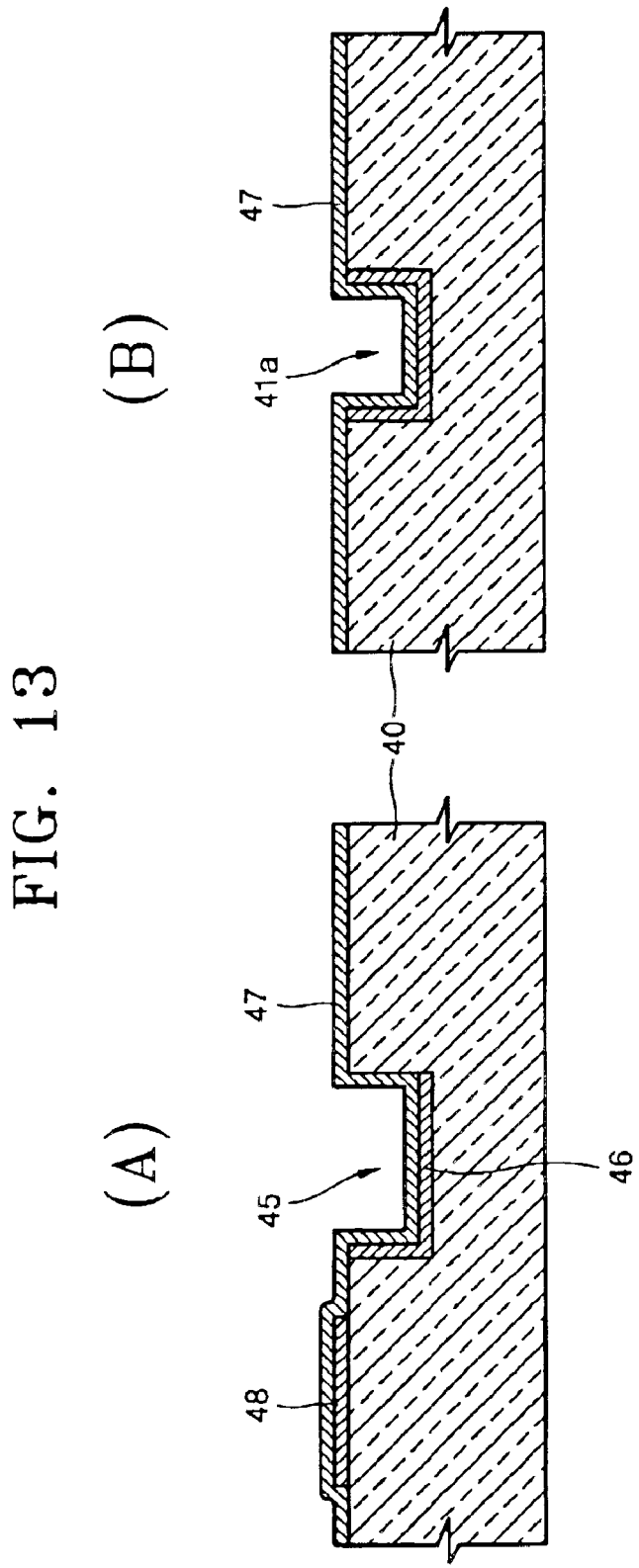
Figure 14:
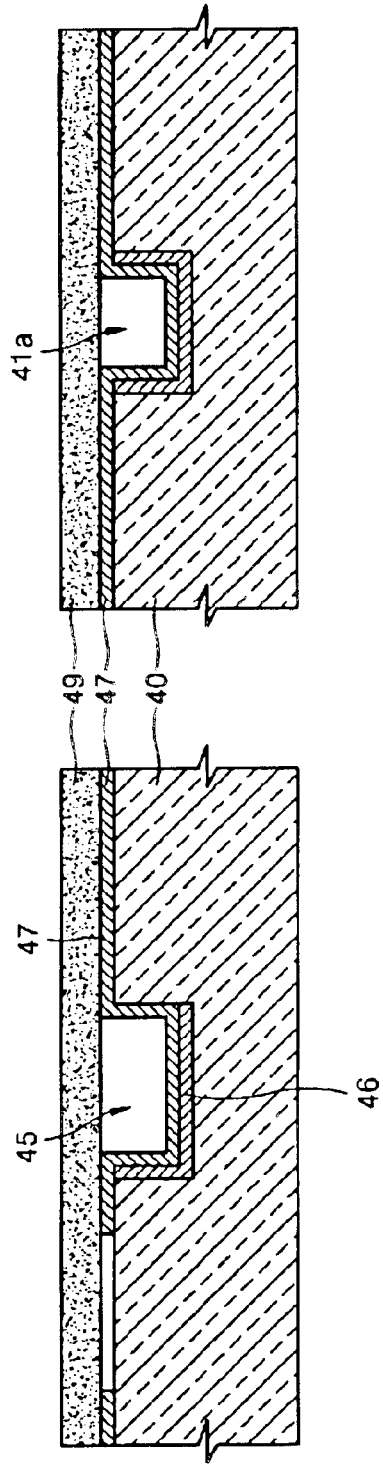
Figure 15:
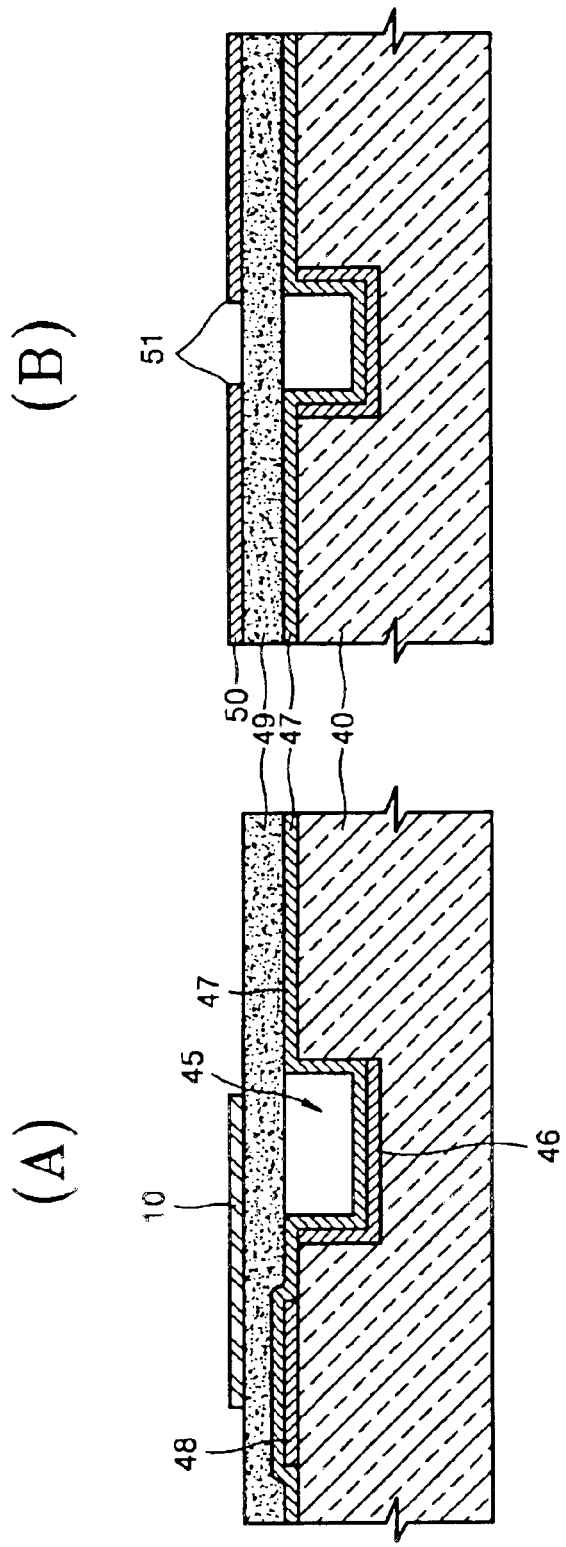
Figure 16:
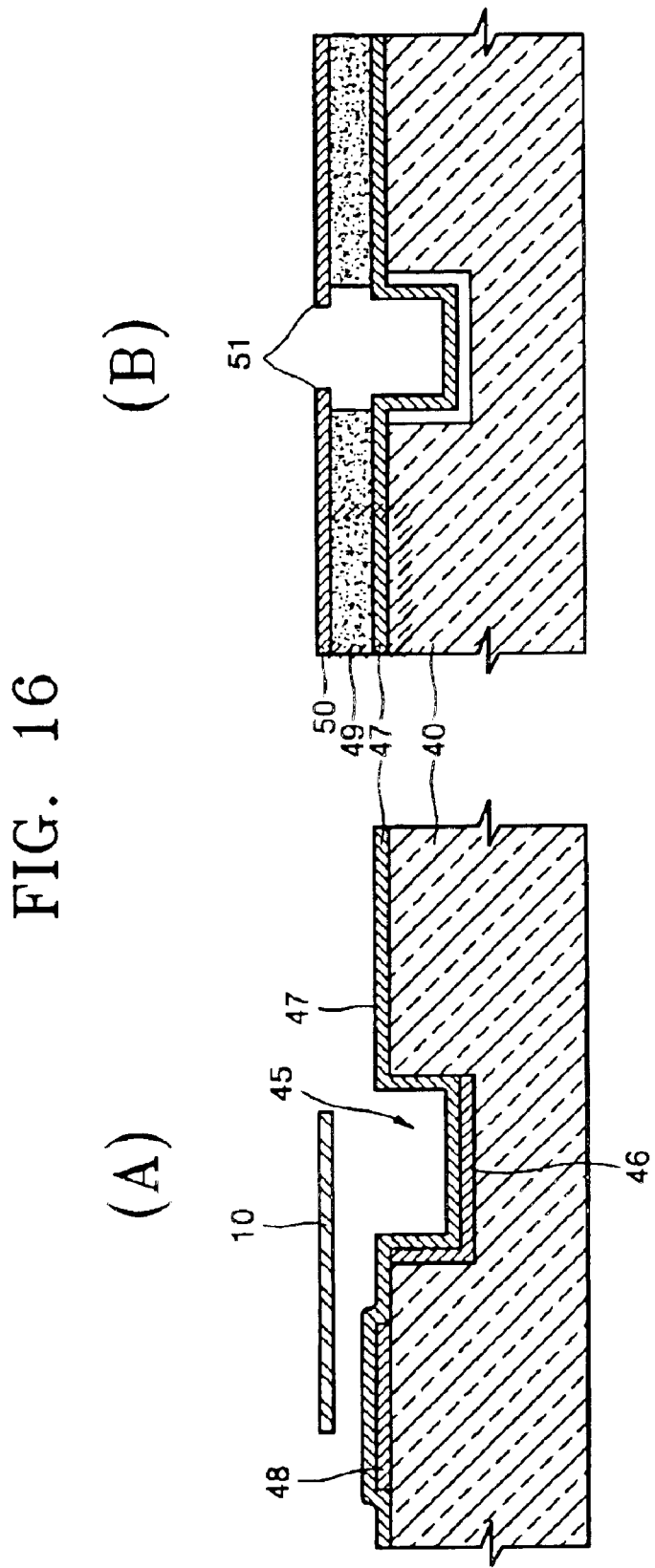

FIGS. 11A and 11B are views for explaining an optically switching state by the rotating mirror 10. FIG. 11A shows that an electrostatic force is not applied to the rotating mirror 10, i.e., the rotating mirror 10 is parallel with the substrate 40 as indicated by "A" in FIG. 7. In this state, beams incident through the optical input fibers 20a and 20b proceed toward the optical output fibers 30a and 30b on the same axes as the optical input fibers 20a and 20b, respectively. FIG. 11B shows that an electrostatic force is applied to the rotating mirror 10, i.e., the rotating mirror 10 is substantially perpendicular to the substrate 40 as indicated by "B" in FIG. 7. In this state, beams incident through the optical input fibers 20a and 20b are reflected from the rotating mirror 10 and then proceed toward the optical output fibers 30b and 30a on the different axes from the optical input fibers 20a and 20b, respectively.

As described above, an optical switch according to the present invention is a 2×2 optical switch in which a moveable electrostatic actuator and optical fibers are combined. The optical switch has a structure in which a mirror and the fibers are arranged by a trench structure having a spring.

A process of manufacturing the optical switch of the present invention having the above-described structure will be described in brief with reference to FIGS. 12A through 16B. This process corresponds to a well-known MEMS process, and thus steps of forming detail structures will be briefly explained herein. FIGS. 12A, 13A, 14A, 15A, and 16A are cross-sectional views for showing a mirror and a well thereunder, and FIGS. 12B, 13B, 14B, 15B, and 16B are cross-sectional views for showing trenches.

FIGS. 12A and 12B, a well 45 having a vertical sidewall 45a and a channel 41a constituting a lower part of the trench 41 into which a fiber is inserted are formed in a silicon wafer or a glass substrate 40. A metal layer is deposited and then patterned to form a fixed electrode 46 and an anti-electrostatic electrode 48.

As shown FIGS. 13A and 13B, an insulating layer 47 is formed on the entire surface of the glass substrate 40.

As shown in FIGS. 14A and 14B, a film 49 made of an insulator is laminated on the insulating layer 47 on the glass substrate 40.

As shown in FIGS. 15A and 15B, a metal layer 50 is deposited on the film 49 and then patterned to form a mirror 10 opposite to the well 45 and a spring 51 that is positioned over the channel 41a.

As shown in FIG. 6, structures for supporting the mirror 10 and fibers are completed using a dry etching process.

As described above, in an optical switch according to the present invention, a mirror can turn at an angle of approximately 90 degrees, which results in adjusting optical paths. In other words, the optical switch according to the present invention can be switched by a moveable actuator having a simple structure without using a comb drive linear actuator having a complicated structure. Here, the thickness of the mirror is determined when depositing a metal layer. In other words, since the metal layer can be deposited to a thickness of hundreds of Å, the thickness of the mirror can be drastically reduced. The reduction in the thickness of the mirror means that the light loss due to an offset in a conventional optical switch can be almost eliminated. Also, since the deposited metal layer is used as the mirror, light loss caused by the roughness of the mirror can greatly be reduced.

The optical switch according to the present invention can be manufactured using a general wafer unlike existing methods to manufacture switches from an SOI wafer. Thus, the optical switch can be manufactured according to a simple unit process, resulting in a great reduction in cost for manufacturing the optical switch.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical switch comprising:
   a substrate;
   a first input fiber and a first output fiber that are arranged at a first predetermined distance from a central point in a first optical path passing through the central point over the substrate;
   a second input fiber and a second output fiber that are arranged at a second predetermined distance from the central point in a second optical path that passes through the central point;
   a rotating mirror that is positioned at around the central point and turns on a turning shaft extending in a direction substantially parallel with the substrate;
   bars that support the rotating mirror so that the rotating mirror rotates; and
   an electrostatic force generating part that supplies a drive force to the rotating mirror.

2. The optical switch of claim 1, wherein trenches into which the first and second input fibers and the first and second output fibers are inserted are formed in the substrate along the first and second optical paths.

3. The optical switch of claim 2, wherein the rotating mirror has a first position where the rotating mirror is substantially parallel with the substrate and a second position where the rotating mirror is substantially perpendicular to the substrate, and turns from the first position to the second position by the electrostatic force generating part.

4. The optical switch of claim 3, wherein an anti-electrostatic electrode, which serves to prevent an electrostatic force from being generated between the rotating mirror and the substrate, is formed at around a sidewall of the electrostatic force generating part contacting the rotating mirror and under the rotating mirror.

5. The optical switch of claim 2, wherein a spring, which serves to prevent the first and second input fibers and the first and second output fibers from separating from the trenches, is formed over the trenches.

6. The optical switch of claim 5, wherein the spring is formed of a material the rotating mirror is formed of.

7. The optical switch of claim 2, wherein an anti-electrostatic electrode, which serves to prevent an electrostatic force from being generated between the rotating mirror and the substrate, is formed at around a sidewall of the electrostatic force generating part contacting the rotating mirror and under the rotating mirror.

8. The optical switch of claim 1, wherein the rotating mirror has a first position where the rotating mirror is substantially parallel with the substrate and a second position where the rotating mirror is substantially perpendicular to the substrate, and turns from the first position to the second position by the electrostatic force generating part.

9. The optical switch of claim 8, wherein an anti-electrostatic electrode, which serves to prevent an electrostatic force from being generated between the rotating mirror and the substrate, is formed at around a sidewall of the electrostatic force generating part contacting the rotating mirror and under the rotating mirror.

10. The optical switch of claim 8, wherein a first incident light beam from the first input fiber is deflected to the second output fiber and a second incident light beam from the second input fiber is deflected to the first output fiber when the rotating mirror is at the second position.

11. The optical switch of claim 1, wherein an anti-electrostatic electrode, which serves to prevent an electrostatic force from being generated between the rotating mirror and the substrate, is formed at around a sidewall of the electrostatic force generating part contacting the rotating mirror and under the rotating mirror.

12. The optical switch of claim 1, wherein the first optical path is substantially orthogonal to the second optical path.

13. The optical switch of claim 1, wherein the bars are torsion bars.

14. An optical switch comprising:
   a substrate;
   a first light input path and a first light output path that are substantially coaxially disposed at a predetermined distance apart in a first optical path;
   a second light input path and a second light output path that are substantially coaxially disposed at a predetermined distance apart in a second optical path, wherein the first optical path and the second optical path intersect at about a central point;
   means for changing the first optical path of a first incident light beam from the first light input path and the second optical path of a second incident light beam from the second light input path, wherein the means for changing the first and second optical paths is rotatively supported at about the central point on the substrate; and an electrostatic force generating part that supplies a drive force to the means for changing the first and second optical paths.

15. The optical switch of claim 14, wherein the means for changing the first and second optical paths deflects the first incident light beam to the second light output path and the second incident light beam to the first light output path.

* * * * *